United States Patent

Jalie

[11] Patent Number: 5,083,859
[45] Date of Patent: Jan. 28, 1992

[54] ASPHERIC LENSES

[75] Inventor: Mohammed Jalie, Balcombe, United Kingdom

[73] Assignee: Opticorp, Inc., Petersburg, Va.

[21] Appl. No.: 636,779

[22] Filed: Jan. 2, 1991

[51] Int. Cl.$^5$ .......................... G02C 7/02; G02C 7/06
[52] U.S. Cl. .................................... 351/176; 351/168; 351/169
[58] Field of Search ....................... 351/159, 168–172, 351/167, 176

[56] References Cited

U.S. PATENT DOCUMENTS 3,960,442 6/1976 Davis et al. ...................... 351/176

Primary Examiner—Scott J. Sugarman
Attorney, Agent, or Firm—Bachman & LaPointe

[57] ABSTRACT

Ophthalmic spectacle lenses with spherical powers between $-0.25$ and $-12.00$ diopters and cylindrical powers between $-0.25$ diopters and $-4.00$ diopters are disclosed. The lenses are provided with a convex spherical anterior surface and a concave aspherical posterior surface which also includes a correction for ocular astigmatism. The form of the posterior surface is determined by optimizing the aspheric curve along each principal meridian of the aspheric surface. The curve along each meridan of the posterior surface is described by the general equation:

$$x = Ay^2 + By^4 + Cy^6 + Dy^8 + Ey^{10} \ldots$$

where
A determines the surface power of the curve at the vertex and is given by:

$$A = F_o / \{10^3 \cdot (n-1) + \sqrt{[10^6 \cdot (n-1)^2 - P_y^2 F_o^2]}\}$$

where
$F_o$ is the required surface power of the curve at its vertex;
n is the refractive index of lens material; and
p is the eccentricity of the conic section at the vertex where $p = 1 - e^2$, and e is the eccentricity of the aspheric surface.

7 Claims, 1 Drawing Sheet

ASPHERIC LENSES

BACKGROUND OF THE INVENTION

This invention relates generally to ophthalmic spectacle lenses and more specifically to ophthalmic spectacle lenses which incorporate a concave aspherical, atoroidal surface to correct ocular astigmatism in both principal meridians for a minus range of lens powers.

The design of ophthalmic lenses is very important in the field of vision correction. Such lenses are used to assist an eye which is unable to properly focus. Ordinarily, the design of a lens is a tradeoff between a variety of factors, including weight, lens thickness and optical errors. Lenses which optimize these factors are known as best-form lenses Jalie, U.S. Pat. No. 4,289,387, describes ophthalmic spectacle lenses of reduced thickness and weight with improved optical properties made possible by aspherizing the major surface of the lens. Prior to this patent, lenses incorporated only spherical or toroidal surfaces. It was discovered that by making the concave surface for a minus lens hyperboloidal, rather than the traditional spherical surface, the surface astigmatism inherent in the hyperboloidal surface could neutralize the aberrational astigmatism of oblique incidence. Corrections for varying degrees of oblique astigmatism could be corrected by varying the eccentricity of the hyperboloidal surface. Thus, by using a hyperboloidal surface on the lens, it was possible to obtain improved overall lens performance and characteristics.

Normally, an aspherical surface may be chosen to eliminate aberrational astigmatism in the case of a spherical lens. However, if a spherical lens is to incorporate a correction for ocular astigmatism, it should include a cylindrical or toroidal surface on the opposite side of the lens. But by incorporating such a surface in the lens, the eccentricity chosen for the spherical power can be correct for only one principal meridian of the lens, for example, the vertical or horizontal, but not both. Thus, there presently exists no practical method to overcome the problem of correction of ocular astigmatism for both principal meridians of minus-powered lenses.

SUMMARY OF THE INVENTION

It is therefore an object of the present invention to provide a practical method for designing ophthalmic lenses which addresses the problem of correction of ocular astigmatism for both principal meridians of minus-powered lenses.

It is another object of the present invention to provide ophthalmic lenses with reduced optical errors in the margins of the lenses, a reduced flat-plate thickness and a reduced weight.

It is a further object of the present invention to provide a concave aspherical lens for the minus range of lens powers offering correction for optical astigmatism in each principal meridian.

The aforementioned and other objects and advantages, which will be discussed in the following description and drawings in which like reference numerals depict like elements, are achieved by the aspheric lens of the present invention.

In accordance with the present invention, ophthalmic lenses with spherical powers between $-0.25$ and $-12.00$ diopters and cylindrical powers between $-0.25$ diopters and $-4.00$ diopters are provided with a convex spherical anterior surface and a concave posterior aspherical surface which also includes a correction for ocular astigmatism.

The form or shape of the aspherical posterior surface is determined through an optimization of the aspheric curve along each principal meridian of the surface. The curvature of each principal meridian is defined by the general equation $$x = Ay^2 + By^4 + Cy^6 + Dy^8 + Ey^{10} + \ldots \quad (1)$$

where

A determines the surface power of the curve at the vertex and is given by the equation:

$$A = F_o / \{10^3 \times (n-1) + \sqrt{[10^6 \times (n-1)^2 - py^2 F_o^2]}\} \quad (2)$$

where $F_o$ is the required surface power of the curve at its vertex;

n is the refractive index of the lens material; and p is the eccentricity of a conic section at the vertex where $p = 1 - e^2$, and e is the eccentricity of the aspheric surface The coefficients B, C, D, etc. are preferably determined by accurate trigonometric ray-tracing. These terms may sum to zero when the curve along the principal meridian in question reduces to a conic section.

Meridians intermediate the principal meridians inclined at an angle $\theta$ to the base-curve meridian, i.e., the meridian of longer vertex radius, are also defined by the equation:

$$x = Ay^2 + By^4 + Cy^6 + Dy^8 + \ldots \quad (3)$$

where $$A = Q / \{10^3 \times (n-1) + \sqrt{[10^6 \times (n-1)^2 - PQ^2y^2]}\}; \quad (4)$$

$$P = P_B - \frac{(P_B - P_C)\theta}{90} \quad (5)$$

$$Q = F_B \cos^2\theta + F_C \sin^2\theta; \quad (6)$$

$F_B$ = absolute power of base curve meridian;
$F_C$ = absolute power of cross curve meridian;
$P_B$ = optimum p-value for base-curve meridian; and
$P_C$ = optimum p-value for cross-curve meridian.

The lens surface opposite the atoroidal surface may be a spherical curve for a single vision lens, or may incorporate a bifocal segment, a toroidal surface or a progressive curve for a progressive power lens.

Ophthalmic lenses made in accordance with the present invention have reduced flat-plate thickness, reduced edge thickness, reduced weight and marginal errors, and further provide a full-correction for marginal errors along each principal meridian of an astigmatic lens.

DESCRIPTION OF THE PREFERRED EMBODIMENT

Figure 5:
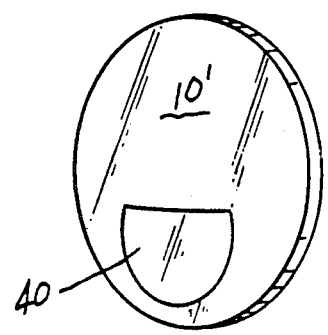
FIG. 5 illustrates a lens in accordance with the present invention having a bifocal segment.

As shown in the Figures, the lens 10 of the present invention includes anterior and posterior surfaces 12 and 14, respectively. Anterior surface 12 is convex, and has a surface shape dependent upon the type of vision correction sought to be accomplished For example, lens surface 12 may be a spherical curve for a single vision lens, may incorporate a bifocal segment 40, (see FIG. 5), may be a toroidal surface, or may be a progressive curve for a progressive power lens.

Figure 1:
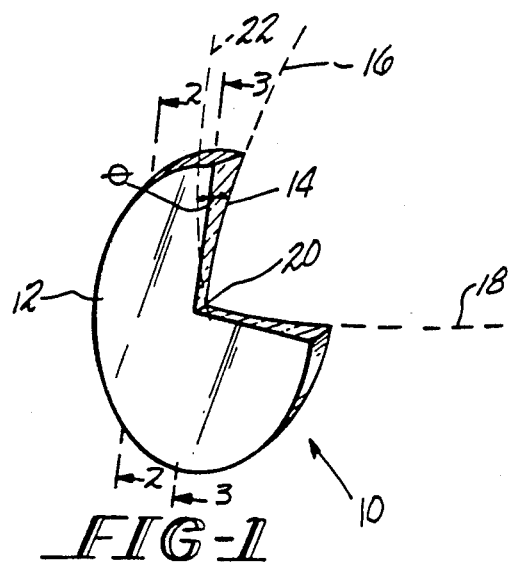
FIG. 1 shows a partial cross-section view of the lens of the present invention.
Figure 2:
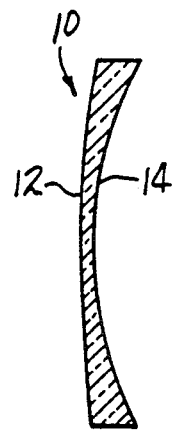
FIG. 2 is a sectional view taken along lines 2—2 in FIG. 1.
Figure 3:
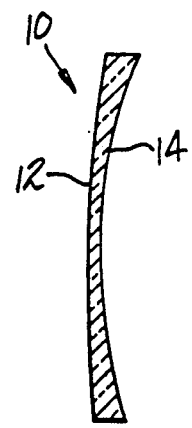
FIG. 3 is a sectional view taken along lines 3—3 in FIG. 1.
Figure 4:
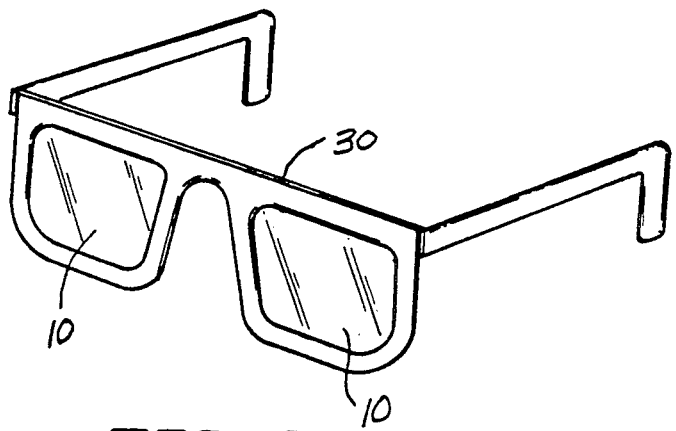
FIG. 4 shows a pair of spectacles incorporating the lens of the present invention.

Posterior surface 14 is an aspherical concave surface which incorporates an aspheric curve of varying eccentricity to correct for ocular astigmatism along the principal meridians, the base meridian 16 and the cross-curve meridian 18. While meridian 16 extends substantially vertically and meridian 18 extends substantially horizontally in the embodiment shown in FIG. 1, it should be recognized that the principal meridians could lie at an angle to the vertical and horizontal axes. Of course, they must always be at right angles to one another. The surface 14 is atoroidal because of the varying eccentricities of the aspheric curves defining its meridians. It is not a rotationally-symmetrical surface of revolution.

Each of the principal meridians is defined by an aspheric section having an eccentricity e which is apposite for the power which lies along that meridian. The curvature of each principal meridian is thus defined by the general equation:

$$x = Ay^2 + By^4 + Cy^6 + Dy^8 + Ey^{10} + \ldots \quad (1)$$

where A determines the surface power of the curve at the vertex 20 and is defined by the equation:

$$A = F_o/\{10^3 \times (n-1) + \sqrt{[10^6 \times (n-1)^2 - P y^2 F_o^2]}\}; \quad (2)$$

$F_o$ = required surface power of the curve at its vertex;
n = refractive index of the lens material; and
p = eccentricity of a conic section at the vertex 20 where $p = 1 - e^2$ and e is the eccentricity of the aspherical surface.

The coefficients B, C, D, etc. in equation (1) may be determined by accurate trigonometric ray-tracing using standard methods well-known to those skilled in the art. Trigonometrical ray tracing, as used herein, refers to the solution of a series of trigonometrical equations whose end results predict the optical performance of the lens form under consideration. These coefficients may each be summed to zero in which case the section along the respective principal meridian reduces to a simple conic section.

The atoroidal posterior surface 14 can be further described using the parameters:

$F_B$ absolute power of the base curve;
$F_C$ = absolute power of cross curve;
$P_B$ = optimum p-value for base curve meridian as determined by accurate trigonometrical ray-tracing;
$P_C$ = optimum p-value for cross-curve meridian as determined by accurate trigonometrical ray-tracing; and
n = refractive index of lens material.

Intermediate the principal meridians 16 and 18, the curvature of the surface 14 is defined by the curvature of intermediate meridians 22 inclined at an angle 8 to the base curve meridian 16, i.e., the meridian of longer vertex radius. The curvature of each of these intermediate meridians is of different aspheric section, the eccentricities being apposite for each section. They too may be defined by the general equation (1); however in this instance:

$$A = Q/\{10^3 \times (n-1) + \sqrt{[10^6 \times (n-1)^2 - PQ^2y^2]}\}$$

where $$P = P_B - \frac{(P_B - P_C)\theta}{90} \text{; and}$$

$$Q = F_b \cos^2\theta + F_C \sin^2\theta.$$

As before, the values of the coefficients B, C, D, etc. in the general equation (1) describing meridians 22 may be optimized by ray-tracing.

An astigmatic eye is one which needs a correcting lens with two different powers at right angles to one another. For example, an eye may need a correcting lens which has a power of −5.00 Diopters in the vertical or base meridian but −6.00 Diopters in the horizontal or cross-curve meridian. It has been found that by using the above design technique, the resulting lens has a smooth atoroidal surface with the desired optical properties along each principal meridian of the lens.

Lens made in accordance with the present invention may be formed from a variety of materials including, but not limited to, plastic such as CR-39 by casting or moulding, or glass by grinding.

The techniques of the present invention have particular utility in the design of singlet lens which may be incorporated into spectacles 30 and which have a power within the range of from about −0.25 to about −12.00 diopters of spherical power and from about −0.25 to about −4.00 diopters of cylindrical power. As used herein, the term "Spherical power" is the maximum or minimum power of an astigmatic lens; and the term "Cylindrical power" is the difference between maximum and minimum powers of an astigmatic lens.

All dimensions in the formulae given herein are to be given in millimeters. The designations "x" and "y" as used herein represent orthogonal coordinates.

The principles of the present invention may be illustrated by the following example. In this example, the atoroidal surface of the lens is to have a −6.00 D base-curve with a −7.00 D cross-curve (−1.00 D cylinder power) and is to be worked on CR 39 material having a refractive index of 1.498. The base-curve meridian is to have a hyperbolic section with a p-value of −1.5, while phe cross-curve meridian is to have a hyperbolic section with a p-value of −0.6. For the purpose of this example the coefficients B, C, D, . . . of the general aspheric equation are set at zero.

Thus $Q = (6 \cos^2\theta + 7 \sin^2\theta)$ $$P = -1.5 - \frac{(-1.5 + 0.6)\theta}{90} = 0.01\theta - 1.5$$

$(n-1) = (1.498 - 1) = 0.498$

Therefore, any meridian of the atoroidal surface inclined at an angle $\theta$ to the base-curve meridian can be described by the equation:

$$x = \frac{(6\cos^2\theta + 7\sin^2\theta)y^2}{498 + \sqrt{\{498^2 - (6\cos^2\theta + 7\sin^2\theta)^2(0.01\theta - 1.5)y^2\}}}$$

When $\theta = 0$, i.e., along the base-curve meridian, this expression redues to:

$$x = \frac{6y^2}{498 + \sqrt{498^2 + 54y^2}} \text{ or } \frac{y^2}{83 + \sqrt{83^2 + 1.5y^2}}$$

When $\theta = 90$, i.e., along the cross-curve meridian, the expression reducse to:

$$x = \frac{7y^2}{498 + \sqrt{498^2 + 29.4y^2}} \text{ or } \frac{y^2}{71.143 + \sqrt{71.143^2 + 0.6y^2}}$$

Along an intermediate meridian, i.e., $\theta = 30$, the expression takes the form $$x = \frac{(6\cos^2 30 + 7\sin^2 30)y^2}{498 + \sqrt{498^2 + 1.2(6\cos^2 30 + 7\sin^2 30)^2 y^2}}$$

or $$x = \frac{y^2}{79.68 \sqrt{79.68^2 + 1.2y^2}}$$

As can be seen from this example, the shape of the lens curvature can be readily determined.

It has been found that the posterior atoroidal surface improves the performance of the lens in each principal meridian. A lens designed in accordance with the present invention provides a full correction for marginal errors along each principal meridian of an astigmatic lens. Additionally, the lenses exhibit reduced optical error in the margins of the lens because the shape of each principal meridian (i.e., the vertex radius and the p-value for asphericity) has been properly chosen to minimize both the tangential error and the aberrational astigmatism for that meridian. Hence, it is possible to control not just the aberrational astigmatism but also the error in power which occurs as a consequence of the aberrational astigmatism. Still further, the lenses exhibit a reduced flat-plate thickness, a reduced weight, and reduced edge thickness.

Although the invention has been described in detail with respect to certain embodiments and examples, variations and modifications exist which are within the scope of the invention as defined in the following claims.

What is claimed is:

1. An ophthalmic lens comprising:

a singlet having an optical axis, a spherical power and a cylindrical power;

said singlet having an atnerior convex surface and a posterior concave atoroidal surface for correcting ocular astigmatism along both principal meridians of said posterior surface; and said posterior surface having a base-curve meridian, a cross-curve meridian, and a plurality of intermediate meridians at an angle $\theta$ to the base-curve meridian and the curvature of each said intermediate meridian being defined by the equation:

$$x = Ay^2 + By^4 + Cy^630 Cy^8 + \ldots$$

where $$A = \frac{Q}{\{10^3 \times (n-1) + \sqrt{[10^6 \times (n-1)^2 - PQ^2 y^2]}\}};$$

$$P = P_B - \frac{(P_B - P_C)\theta}{90};$$

$$Q = F_B\cos^2\theta + F_C\sin^2\theta;$$

n = refractive index of lens material;

$F_B$ = power of surface at said optical axis of said lens across said base-curve meridian;

$F_C$ = power of surface at said optical axis of said lens across said cross-curve meridian;

$P_B$ = p-value describing eccentricity of said base-curve meridian; and $P_C$ = p-value describing eccentricity of said cross-curve meridian.

2. The lens of claim 1 wherein:

said spherical power is in the range of from about $-0.25$ to about $-12.00$ diopters; and said cylindrical power is in the range of from about $-0.25$ to $-4.00$ diopters.

3. A lens according to claim 1 wherein said anterior surface comprises a spherical surface.

4. A lens according to claim 1 wherein said anterior surface comprises a toroidal surface.

5. A lens according to claim 1 wherein said anterior surface includes a bifocal add.

6. An apparatus according to claim 1 wherein said anterior surface comprises a progressive addition surface.

7. A pair of spectacles including at least one ophthalmic spectacle lens comprising:

a singlet having an optical axis, a spherical power and a cylindrical power;

said singlet having an anterior convex surface and a posterior concave atoroidal surface for correcting ocular astigmatism along both principal meridians of said posterior surface; and said posterior surface has a base-curve meridian, a cross-curve meridian, and a plurality of intermediate meridians at an angle $\theta$ to the base-curve meridian and the curvature of each said intermediate meridian being defined by the equation:

$$x = Ay^2 + By^4 + Cy^6 + Dy^8 + \ldots$$

where $Q = F_B\cos^2\theta + F_C\sin^2\theta;$ n = refractive index of lens material $F_B$ = power of surface at said optical axis of said lens across said base-curve meridian;

$F_C$ = power of surface at said optical axis of said lens across said cross-curve meridian;

$P_B$ = p-value describing eccentricity of said base-curve meridian; and $P_C$ = p-value describing eccentricity of said cross-curve meridian.

* * * * *